United States Patent [19]

Leverenz

[11] Patent Number: 4,755,126
[45] Date of Patent: Jul. 5, 1988

[54] PLASTIC INJECTION MOLDING SYSTEM WITH MULTIPLE TIP TORPEDO HEATER

[75] Inventor: David Leverenz, Elk Grove Village, Ill.

[73] Assignee: Fast Heat Element Manufacturing Co., Inc., Elmhurst, Ill.

[21] Appl. No.: 913,020

[22] Filed: Sep. 29, 1986

Related U.S. Application Data

[63] Continuation-in-part of Ser. No. 817,008, Jan. 8, 1986, abandoned.

[51] Int. Cl.$^4$ .............................................. B29C 45/78
[52] U.S. Cl. .................... 425/144; 264/328.8; 264/328.15; 425/549; 425/556; 425/572; 425/581
[58] Field of Search ............... 425/547, 548, 549, 556, 425/568, 572, 581, 588, 143, 144; 264/328.8, 328.14, 328.15, 297.1, 297.2; 356/448

[56] References Cited

U.S. PATENT DOCUMENTS

| | | | |
|---|---|---|---|
| 4,212,626 | 7/1980 | Gellert | 425/572 |
| 4,230,934 | 10/1980 | ter Beek et al. | 425/144 |
| 4,304,544 | 12/1981 | Crandell | 425/568 |
| 4,373,132 | 2/1983 | Vartanian | 264/328.15 |
| 4,552,459 | 12/1985 | Brennensholtz et al. | 356/448 |

Primary Examiner—Jay H. Woo
Assistant Examiner—Timothy W. Heitbrink
Attorney, Agent, or Firm—Leydig, Voit & Mayer

[57] ABSTRACT

A plastic injection molding system having a plurality of multiple tip torpedo heaters which each have a casing with a pair of opposed tips disposed in respective sprue passageways in a mold. An unsheathed electrical heating element is disposed in an internal bore of the casing at each tip and heat transmitting material is compacted in the bore in surrounding relation to the heating element for electrically insulating each heating element from the casing and filling all air voids between the casing and heating element to effect direct heat transfer to the casing. Electrical leads couple the plurality of heating elements to a power source to permit independent temperature control of the individual heating elements and the exposed surfaces of the respective casing tips over which fluid plastic material is directed.

46 Claims, 3 Drawing Sheets

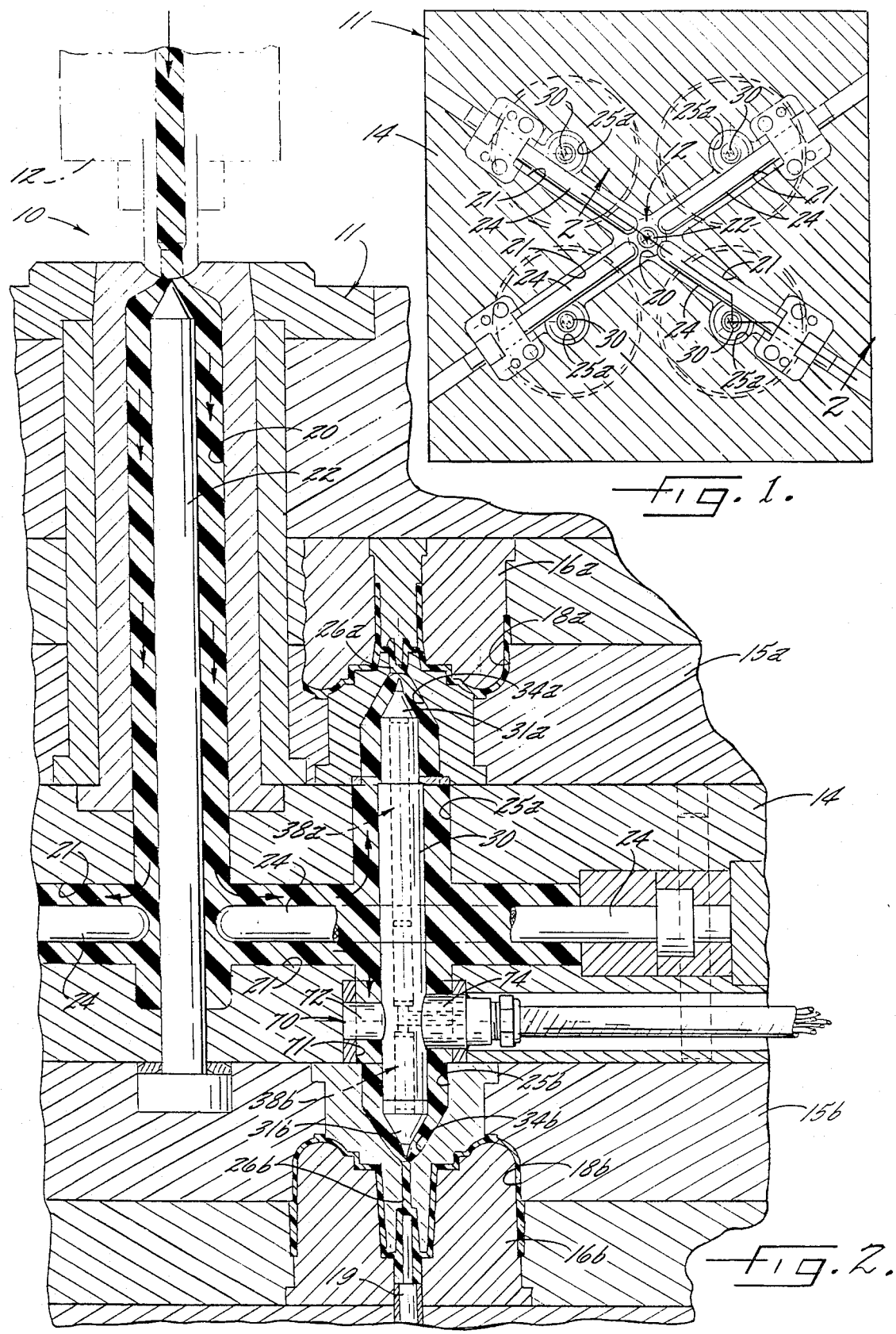

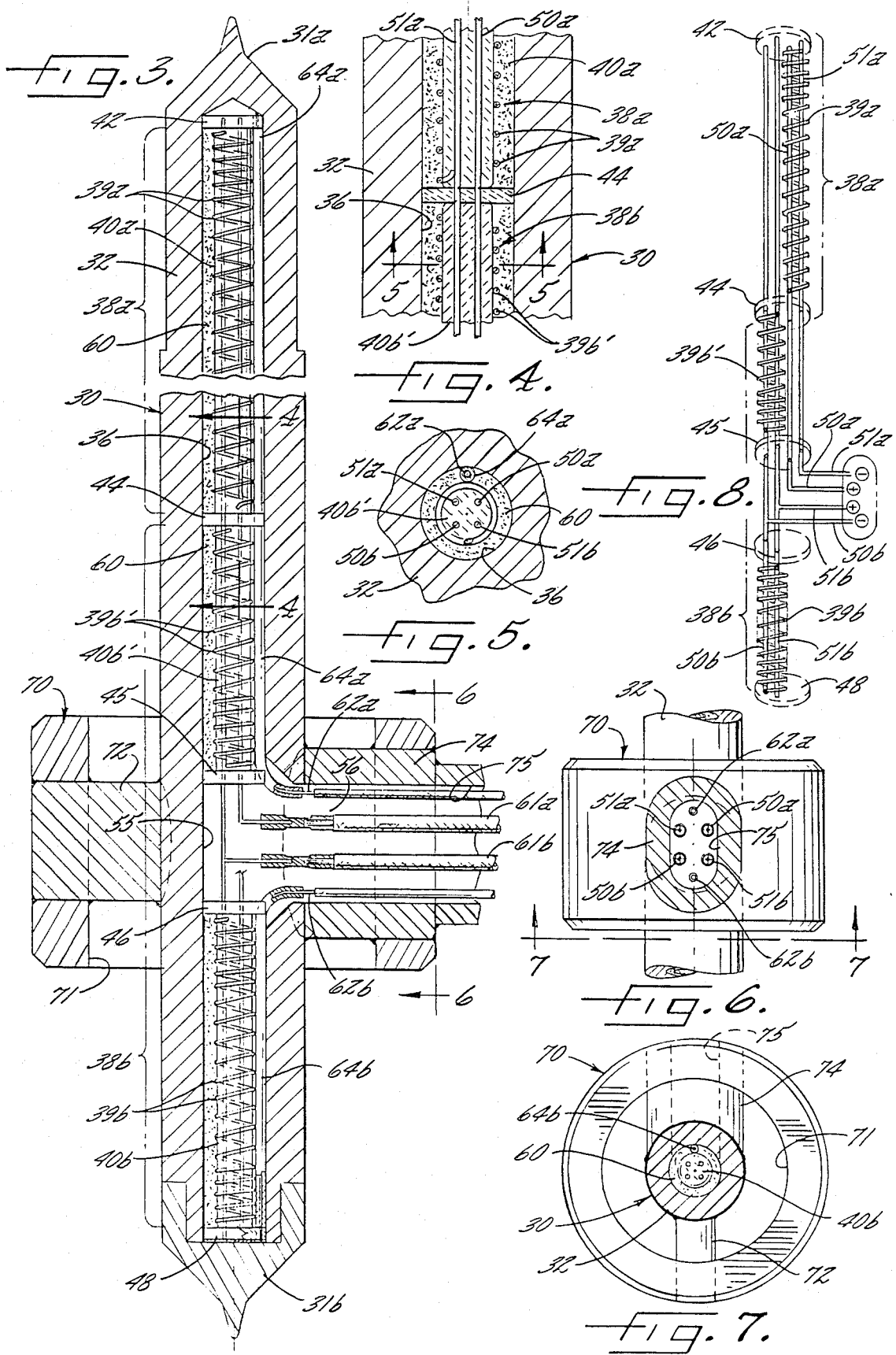

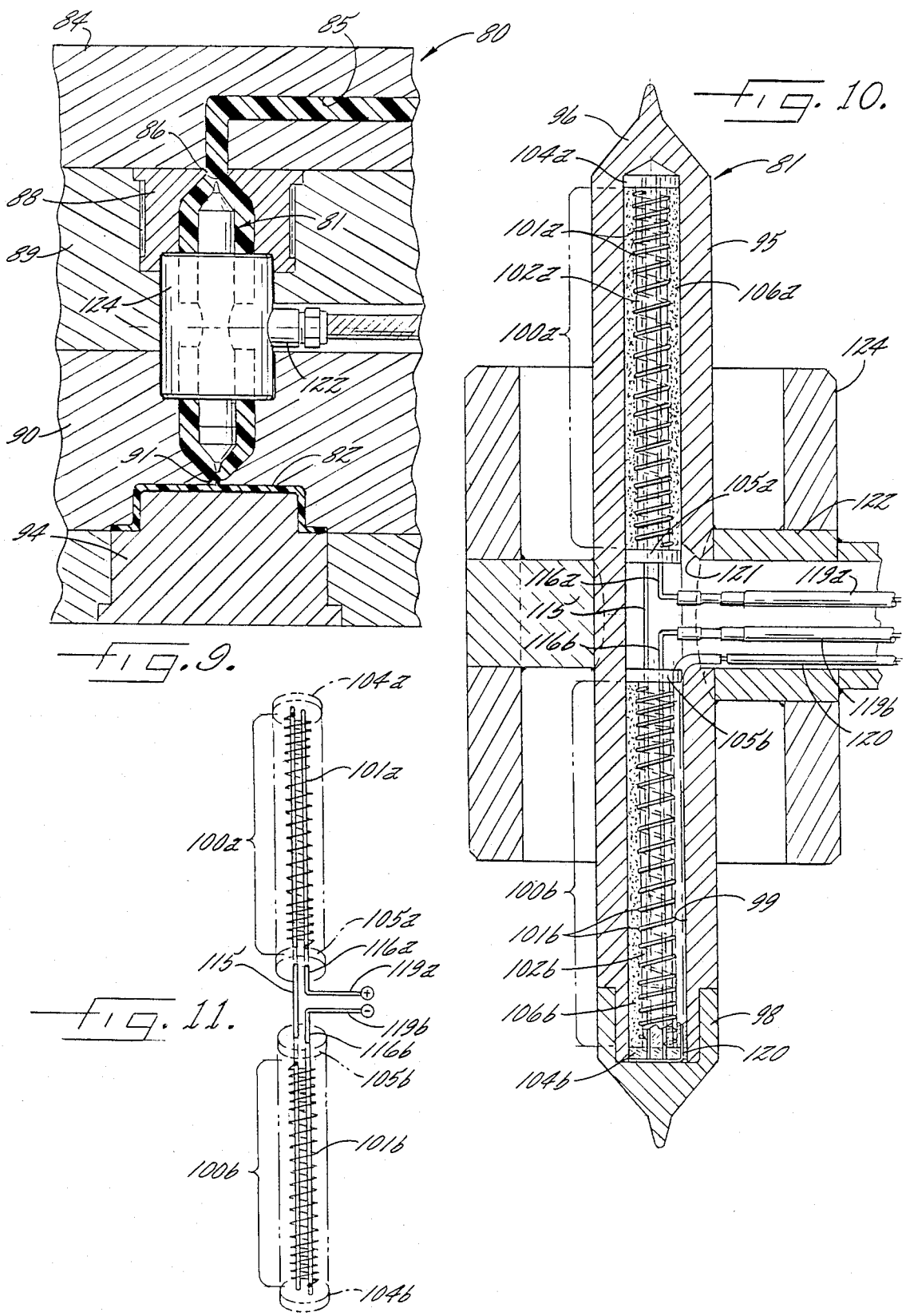

PLASTIC INJECTION MOLDING SYSTEM WITH MULTIPLE TIP TORPEDO HEATER

DESCRIPTION OF THE INVENTION

This application is a continuation in part of application Ser. No. 817,008 filed Jan. 8, 1986, now abandoned.

The present invention relates generally to plastic injection molding equipment, and more particularly, to an improved electrically heated torpedo for use in such equipment.

In plastic injection molding equipment it generally is necessary that each passageway in the mold through which fluid plastic passes during its travel to a mold cavity be heated to a predetermined substantially uniform temperature in order to enable the proper material flow. For this purpose, it is common to utilize sprue torpedo heaters, runner torpedo heaters and the like in each passageway. In injection molding equipment in which there is provided a plurality of mold cavities for simultaneous molding of a plurality of parts, it usually is necessary that the sprue passageways to each cavity be heated in such manner. As a result, the number of mold cavities that can be included in the equipment can be limited by space considerations.

It is an object of the present invention to provide a relatively compact and more efficiently operable plastic injection molding system.

Another object is to provide a plastic injection molding system that permits more efficient space utilization, and hence, permits the use of greater numbers of mold cavities within set space limitations.

A further object is to provide a plastic injection molding system as characterized above in which a plurality of mold cavities are supplied from a single feed passageway so as to reduce the number of passageways and heaters that must be provided in the equipment.

Still another object is to provide a unitary torpedo heater that adapted for heating the inlet flow to a plurality of mold cavities.

Yet another object is to provide a torpedo heater of the above kind that is operable for independently controlling the temperature conditions at a plurality of mold cavity gates or inlets.

Other objects and advantages of the invention will become apparent upon reading the following detailed description and upon reference to the drawings in which:

FIG. 1 is a section of a plastic injection mold embodying the present invention;

FIG. 2 is an enlarged fragmentary section of the mold shown in FIG. 1 taken in the plane of line 2—2;

FIG. 3 is an enlarged longitudinal section of one of the multiple tip torpedo heaters utilized in the illustrated mold;

FIG. 4 is an enlarged fragmentary section taken in the plane of line 4—4 in FIG. 3;

FIG. 5 is a fragmentary section taken in the plane of line 5—5 in FIG. 4;

FIG. 6 is a transverse section of the mounting arrangement and lead outlet for the torpedo heater shown in FIG. 3, taken in the plane of line 6—6;

FIG. 7 is a transverse section taken in the plane of line 7—7 in FIG. 6;

FIG. 8 is a diagrammatic illustration of the electrical winding and lead pin arrangement of the illustrated torpedo heater;

FIG. 9 is a partially diagrammatic section of a plastic injection mold arrangement according to an alternative embodiment of the invention;

FIG. 10 is an enlarged longitudinal section of the multiple tip torpedo heater utilized in the mold arrangement of FIG. 9; and FIG. 11 is a diagrammatic illustration of the electrical winding and lead pin arrangement of the torpedo heater shown in FIGS. 9 and 10.

While the invention is susceptible of various modifications and alternative constructions, a certain illustrated embodiment thereof has been shown in the drawings and will be described below in detail. It should be understood, however, that there is no intention to limit the invention to the specific form disclosed, but on the contrary, the intention is to cover all modifications, alternative constructions and equivalents falling within the spirit and scope of the invention.

Referring now more particularly to FIGS. 1 and 2 of the drawings, there is shown an illustrative plastic injection molding system 10 embodying the present invention. The system 10 includes a mold 11 and conventional plastic injection means, including a nozzle 12, for injecting fluid plastic material into the mold. The mold 11 comprises a frame or base 14 for supporting a plurality of mold cavity members 15a, 15b and core inserts 16a, 16b which together define respective part cavities 18a, 18b in a conventional manner. As will be understood by one skilled in the art, the core inserts 16a, 16b each are moveable relative to the respective cavity member 15a, 15b to permit removal of a formed part, and an ejector pin 19 (only one which is shown) is provided in each core insert to facilitate such part removal. For communicating fluid plastic from the injection nozzle 12 to the cavities 18a, 18b, the mold frame or base 14 is formed with a sprue passageway 20 in communication with the nozzle 12, and in this instance, feeds a plurality of transversely directed runner passageways 21, in this case four in number. For heating the fluid plastic material in the sprue passageway 20, a torpedo heater 22 of a known type is provided, and for heating the material in the runner passageways 21, a respective conventional runner torpedo heater 24 is provided.

In accordance with one aspect of the invention, each runner passageway feeds a plurality of sprue passageways and mold cavity gates which are heated by a single torpedo heater in a manner that permits a more compact and economical mold design for efficient simultaneous molding of a plurality of parts. To this end, in the illustrated embodiment, each runner passageway 21 feeds fluid plastic material to a pair of sprue passageways 25a, 25b and mold cavity gates 26a, 26b which are heated by a respective unitary torpedo heater 30. Since the fluid plastic flow from each runner passageway 21 and associated unitary torpedo heater 30 are identical, only one will be described in detail.

In keeping with the invention, each torpedo heater 30 has a multiplicity of ends or tips 31a, 31b, in this case two in number, which each are adapted for heating plastic material flowing through a respective sprue passageway 25a, 25b and gate 26a, 26b for a respective mold part cavity 18a, 18b. The illustrated torpedo heater 30, as best shown in FIG. 3, has a cylindrical metal casing 32 with one end or tip 31a having an integrally formed tapered configuration disposed in concentric relation to a tapered entry 34a (FIG. 2) from the sprue passageway 25a to the gate 26a. The opposite end or tip 31b of the torpedo heater 30 is a separate member of similar tapered configuration affixed to the otherwise open end of the casing 32.

In accordance with a further feature of the invention, the multiple tipped torpedo heater 30 is adapted for independent, selectively controlled heating of plastic material flowing through each sprue passageway 25a, 25b and gate 26a, 26b for enhancing the balanced flow of plastic to the plurality of part cavities 18a, 18b. To this end, the illustrated torpedo heater casing 32 is formed with an elongated bore 36 and contains a plurality of selectively controllable heating elements 38a, 38b, in this case two in number, adapted for selectively heating the molten plastic material in the respective sprue passageways or zones 25a, 25b. The heating element 38a comprises a resistance wire 39a wound on a ceramic core 40a that is disposed in one end of the casing bore 36 and has a diameter less than the diameter of the bore. The heating element 38b in this instance, for reasons which will become apparent, includes a pair of cores 40b, 40b' disposed in the opposite end of the casing bore 36, with each core having a respective wound resistance wire 39b, 39b'. The cores 40a, 40b, 40b' each are interposed between a relatively thin frangible spacers. In this instance, the core 40a is interposed between an end spacer 42 and a central spacer 44, the core 40b' is interposed between the central spacer 44 and an intermediate spacer 45, and the core 40b is disposed between an intermediate spacer 46 and an end spacer 48.

The heating elements 38a, 38b each are adapted for independent connection to an electrical source to permit their selective energization. For this purpose, the heating element 38a has a pair of lead pins or wires 50a, 51a. One end of the resistance wire 39a is connected to the lead pin 50a adjacent one end of the core 40a and the other end of the resistance wire 39a is connected to the lead pin 51a adjacent the opposite end of the core 40a, as illustrated in FIG. 8. The heating element 38b similarly has a pair of lead pins 50b, 51b which in this case extend through the cores 40b, 40b' and the spacers therebetween. One end of the resistance wire 39b is connected to the lead pin 50b at a point adjacent one end of the core 40b and the opposite end of the wound resistance wire 39b is connected to the lead pin 51b at the opposite end of the core 40b. The opposed ends of the resistance wire 39b' are similarly connected to the lead pins 50b, 51b adjacent opposite ends of the core 40b' such that the resistance wires 39b, 39b' are electrically connected in parallel across the lead pins 50b, 51b.

To facilitate manufacture, the cores 40a and 40b' both are formed with four lead pin apertures, and the lead pins 50b, 51b, like the lead pins 50a, 51a extend through the core 40a and into the end spacer 42, even through the lead pins 50b, 51b are not coupled to the resistance wires of the core 40a. The lead pins 50a, 51a in the illustrated embodiment need only extend from the end spacer 42 into the space 55 defined between the intermediate spacers 45, 46. Alternatively, the core 40a, like the core 40b, need only be formed with two apertures for the respective lead pins 50a, 51a of that heating element, and the lead pins 50b, 51b can be made of shorter length so as to extend only between the spacers 48 and 44. At the location of the spacing 55, the torpedo casing 32 is formed with an aperture 56 to permit exiting of the leads from the pins 50a, 51a, and 50b, 51b for connection to an electrical source, as will become apparent.

It will be appreciated that while in the illustrated embodiment the electrical resistance wires for the heating element 38b are shown connected electrically in parallel, alternatively, the resistance wires could be connected in series. Moreover, while the illustrated torpedo heater has a pair of heating elements 38a, 38b, depending upon the length of the heater, alternatively greater numbers of axially aligned and independently controlled heating elements could be utilized so as to permit selective heat control at zones intermediate the opposed ends of the torpedo heater.

To compensate for irregular heat drains or losses along the length of the torpedo heater 30, and thus provide a more uniform heat profile for heating fluid plastic directed through the sprue passageways 25a, 25b, the electrical windings 39a, 39b, 39b', are shaded or concentrated at selected locations. In the illustrated embodiment, the windings 39a and 39b both are shaded, as illustrated in FIGS. 3 and 8, adjacent their respective tips 31a, 31b. In addition, the winding 39b and 39b' are shaded adjacent the spacing 55 to compensate for additional heat losses at such location.

During manufacture of the torpedo heater 30, heat transmitting material 60, such as magnesium oxide powder or similar material, is deposited in the space between the cores 40a, 40b, 40b' and the casing bore 36. The assembly preferably is vibrated to pack the magnesium oxide powder tightly within the casing to fill all air voids within the assembly. Means, such as an adhesive, may be provided for temporarily retaining the intermediate spacers 45, 46 in position so as to tightly retain the magnesium oxide powder within the casing.

The assembly of the casing 32 and heating elements 38a, 38b is then swaged so as to reduce the diameter of the casing bore 36 and compress the packed magnesium oxide powder within the bore. This provides an effective heat transfer contact between the heating elements and the casing for enhancing efficient and uniform heat transfer to the casing. Following swaging, the adhesive or other means utilized for temporarily retaining the spacers 45, 46 within the casing may be removed, with the spacers 45, 46 being fixedly retained in mounted position by the resulting tight friction force.

For coupling the pairs of lead pins 50a, 51a and 50b, 51b for the respective heating elements 38a, 38b to an electrical source, appropriate pairs of lead wires 61a and 61b are connected thereto. To independently control the temperature of the heating elements 38a, 38b, a respective thermocouple probe 62a, 62b is provided for each heating element. In the illustrated embodiment, a hypo tube 64a, 64b for each heating element is disposed adjacent the perimeter of the bore 36 of the casing and embedded in the magnesium oxide powder 60, and the respective thermocouple probes 62a, 62b for each heating element is housed within the hypo tubes 64a, 64b and extend to a predetermined point in the flow path for sensing the temperature at such point. It will be understood by one skilled in the art that power to the respective heating element may thereby be selectively controlled in a known manner.

In keeping with the invention, means are provided for permitting the exit of the leads 61a, 61b from the torpedo heater and for supporting the torpedo heater intermediate its ends in concentric relation in the sprue passageways 25a, 25b so as to permit fluid plastic to be directed onto the torpedo heater at a generally central location, with the material then flowing opposite substantially equal distances along the torpedo heater to the respective part cavity 18a, 18b. To this end, the support means in the form of a collar 70 is provided which has an internal longitudinal aperture 71 substantially greater than the outer diameter of the torpedo heater casing 32 so as to permit the substantially uninterrupted flow of plastic along the torpedo. The collar 70 is disposed in off centered longitudinal relation to the torpedo heater 30, in this case on the left side of the heater, as viewed in FIG. 3. For concentrically supporting the torpedo within the ring, in this instance a pin 72 is welded in an aperture in the collar 70 and extends inwardly for engaging a topside of the torpedo heater, as viewed in FIG. 3. A bushing 74, also is welded in an aperture in the collar, extends inwardly for engaging and supporting an underside of the torpedo heater. The bushing 74 is formed with a central aperture 75 that communicates with the aperture 56 in the torpedo heater casing 32 to permit exiting of the leads 61a and 61b, as well as the leads from the thermocouples 62a, 62b. It will be understood that the bushing 74 may have a threaded outer end for receiving the threaded fitting of an appropriate convolute tubing through which the lead wires of the torpedo heater and thermocouples may be trained to the electrical source and control.

In operation of the plastic injection molding system 10, molten plastic is directed from the nozzle 12 into the sprue passageway 20 (FIG. 2) for feeding the plurality of transversely directed runner passageways 21. Each runner passageway, in turn, feeds a plurality of sprue passageways 25a, 25b which can be selectively heated by the respective unitary torpedo heater 30. The flow of plastic in each sprue passageway 25a, 25b may be independently controlled for maintaining a balanced flow of material into the plurality of part cavities 18a, 18b for optimum and efficient operation of the mold. In the event adjustment in temperature in one sprue passageway is necessary, it may be accomplished without affecting the temperature or flow in the other sprue passageway. The off centered mounting of the support collar 70 for the torpedo heater further permits the introduction of the fluid plastic onto the torpedo heater at a generally central location so that the flows to the respective part cavities 18a, 18b are substantially the same length.

Referring now to FIGS. 9-11, there is shown a plastic injection molding system 80 embodying an alternative form of the invention. The molding system 80 in this instance includes a multiple tip torpedo heater 81 disposed in the path of the flow stream to a mold cavity 82 so that the flow stream passes over the entire length of the heater 81 and is maintained at the desired, substantially uniform temperature during such travel. The molding system 80 includes a manifold plate 84 that may be externally heated in a conventional manner and is formed with a flow passageway 85. The flow passageway 85 communicates with the sprue inlet 86 of an annular head 88 that is interposed between the manifold plate 84 and a central manifold plate 89. A cavity plate 90 is disposed in adjacent relation to the manifold plate 89 and is formed with a gate 91 that communicates with the mold cavity 82 defined by the cavity plate 90 and a core insert 94.

For heating the fluid plastic flow stream during its travel between the sprue inlet 86 and the gate 91 of the mold cavity 82, the multiple tip torpedo heater 81 is mounted with one tip disposed adjacent the sprue inlet 86 and the opposite tip disposed adjacent the mold cavity gate 91. The torpedo heater 81, as best shown in FIG. 10, has a cylindrical casing 95 with one end or tip 96 having an integrally formed tapered configuration disposed in concentric relation to a tapered entry from the sprue inlet 86. The opposite end or tip 98 of the torpedo heater 80 is a separate member of similar tapered configuration affixed to the otherwise open end of the casing 95 and disposed in concentric relation to a tapered entry to the gate 91.

The heater casing 95 is formed with an elongated bore 99 and in this case contains heating elements 100a, 100b adjacent each tip for heating a respective half of the heater. The heating elements 100a, 100b each comprise a resistance wire 101a, 101b wound on a ceramic core 102a, 102b, which each are interposed between respective pairs of frangible spacers 104a, 105a and 104b, 105b. Heat transmitting material 106a, 106b, such as magnesium oxide powder, is tightly compacted in the space between the cores 102a, 102b and the casing bore 99 in the manner previously described.

In keeping with a further aspect of the invention, the resistance wires 101a, 101b for the heating elements 100a, 100b are electrically connected in series in order to permit the utilization of heavier gauge resistance wire for particular applications, and thus enhance the reliability and life of the heater. Such series connection of the heating element resistance wires 101a, 101b has been found to have particular advantage in relatively smaller size torpedo heaters which would otherwise require relatively fine gauge wire in order to achieve the desired resistive requirements, particularly when connected to a 240 volt electrical power source.

To facilitate the series connection of the heating element resistance wires 101a, 101b, a lead pin 115 is provided which extends substantially the length of the casing bore 99 through the cores 104a, 104b of both heating elements. A second lead pin 116a extends through the core 104a of the heating element 100a with one end thereof extending into a space 118 between the heating elements, and a third lead pin 116b extends through the core 104b of the other heating element 100b with one end thereof similarly extending into the space 118 between the heating elements. As best illustrated in FIG. 11, the resistance wire 101a for the heating element 100a has one end connected to the lead pin 115 and its other end connected to the lead pin 116a. The resistance wire 101b for the heating element 100b has one end connected to the lead pin 115 which is common to the heating element 100a and its other end connected to the lead pin 116b. The lead pins 116a and 116b in turn are connected to a power source through lead wires 119a, 119b, with the result that the current flows in series through the resistive wires 101a, 101b of the heating elements. A thermal couple probe 120 is provided for sensing the temperature at one of the tips to permit proper control of the operating temperature of the heating elements.

The lead wires 119a, 119a and thermal couple 120 exit through an opening 121 in the casing 95 and centrally through a bushing 122 of a support collar 124 in a manner similar to that previously described, except that in this instance the opening 121 and bushing 122 are located at a central location along the length of the torpedo heater. It will be understood that the ends of the collar 124 are maintained in sealed relation between the annular head 88 and cavity plate 90 between which it is disposed.

In operation of the mold system 80, the melt stream is directed over the entire length of the torpedo heater 81 between the sprue inlet 86 and mold cavity gate 91. By appropriately shading the windings of the heating elements 100a, 100b, as previously described, a substantially uniform heat profile may be generated along each heating element. Since the heating elements 100a, 100b in this case are substantially identical, as the melt stream passes over the length of the torpedo heater it may be maintained at the desired uniform temperature with a high degree of accuracy and efficiency.

From the foregoing, it will be appreciated by one skilled in the art that the present invention provides a relatively compact and efficiently operable plastic injection molding system. The system further permits more efficient space utilization, by permitting single runner passageways to each communicate with plurality of sprue passageways, which in turn can be heated by multiple tip torpedo heaters. The multiple tip torpedo heater furthermore has a relatively compact and economical design which lends itself to easy and versatile installation and efficient operation.

I claim as my invention:

1. A torpedo heater comprising an elongated metal casing having an exposed outer cylindrical surface of substantially uniform diameter with a tip at each end thereof over which a fluid material may be directed at an elevated temperature, said casing being formed with an internal bore at the location of each said tip, an unsheathed electrical heating element disposed in the bore of each said tip, heat transmitting material compacted in the bore and surrounding each heating element for electrically insulating the heating elements from the casing and filling all air voids between said casing and each heating element to effect direct heat transfer to the casing from the heating elements, means electrically coupling said heating elements to a power source, and means for controlling the temperature of said heating elements and thus the exposed surfaces of casing tips within which said heating elements are disposed.

2. The torpedo heater of claim 1 in which each said tip has a tapered outermost end.

3. The torpedo heater of claim 1 in which each said heating element includes an elongated insulating core and an associated resistance wire assembled thereon.

4. The torpedo heater of claim 3 in which said electrical coupling means includes a pair of lead pins extending through the elongated insulating core of each heating element with the resistance wire of each heating element being coupled between the lead pins for the elongated insulating core, and means connecting pairs of said lead pins for each heating element to a power source.

5. The torpedo heater of claim 4 wherein said control means includes a thermocouple associated with each heating element, each said thermocouple extending into the casing bore to a predetermined temperature sensing point.

6. The torpedo heater of claim 4 in which one heating element comprises a pair of axially spaced insulating cores wherein each axially spaced insulating cores have an associated resistance wire, said resistance wires for said axially spaced insulating cores both being coupled between the lead pins for said one heating element.

7. The torpedo heater of the claim 6 in which said casing is formed with an aperture adjacent the spacing between said axially spaced cores, the lead pins for each heating element extending to a location adjacent said casing aperture, and said electrical coupling means includes means extending through said casing aperture for connecting said lead pins to said power source.

8. The torpedo heater of claim 3 in which each said heating element has said resistance wire wound about each elongated insulating, and the resistance wire of at least one of the heating elements is wound with a greater concentration of turns at one location than at another location.

9. A torpedo heater of claim 8 in which resistance wires for the heating elements are wound with a greater concentration of turns at locations immediately adjacent the ends of each tip than at other locations.

10. The torpedo heater of claim 6 in which said resistance wire for each axially spaced insulating core is wound about said axially spaced insulating core, and said resistance wires are wound with a greater concentration of turns at locations immediately adjacent the spacing between the axially spaced insulating cores than at other locations.

11. A torpedo heater comprising a metal casing having an exposed outer cylindrical surface of substantially uniform diameter with a tip at each end thereof over which a fluid material may be directed at an elevated temperature, said casing being formed with an internal bore at the location of each said tip, electrical heating means disposed in the bore of each said tip for heating said tips, means for electrically coupling said heating means to a power source, and means for controlling the temperature of said heating means and thus the exposed surfaces of said tips.

12. The torpedo heater of claim 11 in which each said tip has a tapered outermost end.

13. The torpedo heater of claim 11 in which said electrical heating means includes an individual electrical heating element disposed in the bore of each said tip.

14. The torpedo heater of claim 13 in which each said heating element comprises a core with a resistance wire disposed thereon and heat transmitting material compacted in the bore and surrounding each heating element for electrically insulating the heating element from the casing and filling all air voids between said casing and said heating element to effect direct heat transfer to the casing from the heating element.

15. The torpedo heater of claim 14 in which said heating elements each have connector pins extending through the cores thereof, said heating element resistant wires being connected to selected of said pins, and means for coupling said pins to said power source.

16. The torpedo heater of claim 15 in which the resistance wires for said heating elements are connected to respective individual pairs of said connector pins, and means for connecting said individual pairs of connector pins to a power source to permit individual control of the temperature of the respective heating element.

17. The torpedo heater of claim 16 in which at least one said heating element includes a plurality of resistance wires that are electrically connected in parallel to the selected pair of connector pins for said heating element.

18. The torpedo heater of claim 15 in which said resistance wires for said heating elements are electrically connected in series with said connector pins.

19. A plastic injection molding system comprising a mold having first passageway means into which a fluid plastic flow stream is introduced, said first passageway means communicating with a plurality of sprue passageways, and said sprue passageways each communicating with a respective part cavity; a unitary torpedo heater having a casing with an exposed outer cylindrical surface of substantially uniform diameter with a tip at each end thereof disposed in a respective one of said sprue passageways over which fluid plastic material flows as it is directed to the respective part cavity; said casing being formed with an internal bore at the location of each said tip; electrical heating means disposed in the bore at each said tip for heating said tips; means coupling said heating means to a power source; and means for regulating the temperature of said heating means and thus the exposed surfaces of the casing tips within which said heating means is disposed.

20. The plastic injection molding system of claim 19 in which each said tip has a tapered shape directed in the line of material flow through the respective sprue passageway.

21. The plastic injection molding system of claim 20 including means intermediate the ends of said casing for supporting said casing about the cylindrical surface thereof such that said tips and a substantial portion of the outer cylindrical surface thereof are concentrically disposed within each respective sprue passageway.

22. The plastic injection molding system of claim 21 in which said supporting means comprises a collar having an aperture substantially greater than the diameter of said casing for receiving said casing while permitting fluid material flow between said casing and collar, and retaining means for holding said casing concentrically within said collar.

23. The plastic injection molding system of claim 22 in which casing is formed with an aperture, said retaining means including a radially disposed bushing member having an aperture communicating with said casing aperture through which said electrical coupling means extends.

24. The plastic injection molding system of claim 22 in which said collar is disposed at an off-centered location along the longitudinal axis thereof.

25. The plastic injection molding system of claim 19 in which the sprue passageways within which said pair of tips are disposed are substantially equal in length.

26. The plastic injection molding system of claim 25 in which fluid plastic material is introduced into said pair of sprue passageways at an approximate central location along said torpedo heater casing.

27. The plastic injection molding system of claim 19 in which said electrical heating means includes an individual electrical heating element disposed in the bore of each said tip, said heating elements each comprising a core with a resistance wire disposed thereon and heat transmitting material compacted in the bore and surrounding each heating element for electrically insulating the heating element from the casing and filling all air voids between said casing and heating element to effect direct heat transfer to the casing from the heating element.

28. A plastic injection molding system comprising a mold having first passageway means into which a fluid plastic flow stream is introduced, a plurality of second passageways each communicating with said first passageway means, said second passageways each communicating with a pair of sprue passageways, and said sprue passageways each communicating with a respective part cavity; a plurality of torpedo heaters each having a casing with an exposed outer cylindrical surface of substantially uniform diameter with a tip at each end thereof disposed in a respective one of said sprue passageways of each said pair such that a predetermined spacing exists about said tip and a length of said casing surface adjacent thereto so as to permit the flow of fluid plastic material over the tip and said length of cylinder surface as it is directed to a respective part cavity; said casing of each torpedo heater being formed with an internal bore at the location of each said tip; electrical heating means disposed in the bore at each said tip for heating said tips; means coupling said heating means to a power source; and means for controlling the temperature of said heating means and thus the exposed surfaces of casing tips within which said heating means is disposed.

29. The plastic injection molding system of claim 28 in which said electrical heating means includes an individual electrical heating element disposed in the bore of each said tip, said heating elements each comprising a core with a resistance wire disposed thereon and heat transmitting material compacted in the bore and surrounding each heating element for electrically insulating each heating element from the casing and filling all air voids between said casing and each heating element to effect direct heat transfer to the casing from the heating elements.

30. The plastic injection molding system of claim 28 in each second passageway communicates with a respective pair of sprue passageways at an approximate central location along a torpedo heater casing.

31. The plastic injection molding system of claim 30 in which the sprue passageways of each pair are substantially equal in length.

32. The plastic injection molding system of claim 28 including means for supporting the casing of each torpedo heater such that said tips and length of casing surface adjacent thereto are disposed concentrically within the respective sprue passageways, said supporting means including collar having an aperture substantially greater than the diameter of said casing for receiving the casing while permitting fluid material flow between said casing and collar, and radial retaining means for holding said casing concentrically within said collar.

33. The plastic injection molding system of claim 32 in which casing of each torpedo heater is formed with an aperture in the cylindrical surface intermediate the ends thereof, said retaining means including a radially disposed bushing member having an aperture communicating with said casing aperture through which said electrical coupling means extends.

34. A plastic injection molding system comprising a mold having first passageway means into which a fluid plastic flow stream is introduced, said first passageway means communicating with a sprue inlet, said mold defining a cavity with a gate inlet, second passage means communicating between said sprue inlet and gate inlet, a torpedo heater disposed in said second passageway for heating fluid plastic flowing from said sprue inlet to said gate inlet, said torpedo heater having a casing an exposed outer cylindrical surface of substantially uniform diameter with a tip at each end thereof disposed in adjacent relation to a respective one of said sprue inlet and gate inlet over which fluid plastic material flows; said casing of each torpedo heater being formed with an internal bore at the location of each said tip; electrical heating means disposed in the bore at each said tip; means coupling said heating means to a power source; and means for controlling the temperature of said heating means and thus the exposed surfaces of casing tips within which said heating means is disposed.

35. The plastic injection molding system of claim 34 in which in which said electrical heating means includes an individual electrical heating element disposed in the bore of each said tip; said heating elements each comprising a core with a resistance wire disposed thereon and heat transmitting material compacted in the bore and surrounding each heating element for electrically insulating the heating elements from the casing and filling all air voids between said casing and each heating element to effect direct heat transfer to the casing from the heating elements.

36. The plastic injection molding system of claim 34 including means for supporting the casing of each torpedo heater concentrically in said second passageway, said supporting means including a collar separate from said casing having an aperture substantially greater then the diameter of said casing for receiving the casing while permitting fluid material flow between said casing and collar, and radial retaining means for holding said casing intermediate the ends thereof concentrically within said collar so that substantially the entire outer cylindrical surface of said casing and the tips thereof are exposed to the fluid plastic flow stream.

37. The plastic injection molding system of claim 36 in which said casing is formed with an aperture intermediate the ends thereof, and said retaining means including a radially disposed bushing member having an aperture communicating with said casing aperture through which said electrical coupling means extends.

38. The plastic injection molding system of claim 37 in which said casing aperture and radial bushing are disposed at a central location intermediate the ends of said casing.

39. A torpedo heater comprising a metal casing having a plurality of tips, each tip having an exposed surface over which a fluid material may be directed at an elevated temperature, said casing being formed with an internal bore at the location of each said tip, and unsheathed electrical heating element disposed in the bore of each said tip, heat transmitting material compacted in the bore and surrounding each heating element for electrically insulating the heating element from the casing and filling all air voids between said casing and heating element to effect direct heat transfer to the casing from the heating element, means electrically coupling said heating elements to a power source, means for controlling the temperature of said heating elements and thus the exposed surfaces of casing tips within which said heating elements are disposed, and said electrical coupling means and temperature controlling means including means for independently controlling the temperature of each said heating element.

40. A torpedo heater comrising a metal casing having a plurality of tips, each tip having an exposed surface over which a fluid material may be directed at an elevated temperature, said casing being formed with an internal bore at the location of each said tip, electrical heating means disposed in the bore of each said tip for heating said tips, means for electrically coupling said heating means to a power source, means for controlling the temperature of said heating means and thus the exposed surfaces of said tips, and said electrical coupling means and temperature controlling means including means for independently controlling the temperature of said heating means at each said tip.

41. A plastic injection molding system comprising a mold having a first passageway means into which a fluid plastic flow stream is introduced, said first passageway means communicating with a plurality of sprue passageways, and said sprue passageways each communicating with a respective part cavity; a unitary torpedo heater having a casing with a multiplicity of tips, each tip of which is disposed in a respective one of said sprue passageways and has an exposed surface over which fluid plastic material flows as it is directed to the respective part cavity; said casing being formed with an internal bore at the location of each said tip; electrical heating means disposed in the bore at each said tip for heating said tips; means coupling said heating means to a power source; means for controlling the temperature of said heating means and thus the exposed surfaces of the casing tips within which said heating means is disposed; and said electrical heating means and temperature controlling means including means for independently controlling the temperature of said heating element means at each said tip.

42. A plastic injection molding system comprising a mold having a first passageway means into which a fluid plastic flow stream is introduced, a plurality of second passageways each communicating with said first passageway means, said second passageways each communicating with a pair of sprue passageways, and said sprue passageways each communicating with a respective part cavity; a plurality of torpedo heaters each having a casing with tips at opposed ends thereof; said tips of each torpedo heater being disposed in a respective one of said sprue passageways of each said pair and having an exposed surface over which fluid plastic material flows as it is directed to a respective part cavity; said casing of each torpedo heater being formed with an internal bore at the location of each said tip; electrical heating means disposed in the bore at each said tip for heating said tips; means coupling said heating means to a power source; means for controlling the temperature of said heating means and thus the exposed surfaces of casting tips within which said heating means is disposed; and said electrical coupling means and temperature controlling means including means for independently controlling the temperature of each of said heating elements.

43. A torpedo heater comprising a metal casing having a plurality of tips, each tip having an exposed surface over which a fluid material may be directed at an elevated temperature, said casing being formed with an internal bore at the location of each said tip, an unsheathed electrical heating element disposed in the bore of each said tip, each said heating element including an elongated insulating core and an associated resistance wire assembled thereon, heat transmitting material compacted in the bore and surrounding each heating element from the casing and filling all air voids between said casing and each said heating element to effect direct heat transfer to the casing from each said heating element, means electrically coupling said heating elements to a power source, said electrical coupling means including a pair of lead pins extending through the core of each heating element with the resistance wire of each heating element being coupled between the lead pins that extend through the core of the heating element, said casing being formed with an aperture, the lead pins for each heating element extending to a location adjacent said casing aperture, and said electrical coupling means including means extending through said casing aperture for connecting said lead pins to said power source.

44. The torpedo heater of claim 43 in which said heating element cores are in axially aligned relation, and said casing aperture is adjacent the ends of a pair of said axially aligned cores.

45. The torpedo heater of claim 43 in which at least one of said heating elements includes a plurality of resistance wires that are electrically connected in parallel to the pair of lead pins that extend through the core of said heating element.

46. The torpedo heater of claim 43 in which said resistance wires for said heating elements are electrically connected in series with said connector pins.

* * * * *